United States Patent
McBain et al.

(10) Patent No.: US 7,105,231 B2
(45) Date of Patent: Sep. 12, 2006

(54) IN-MOLD COATING BARRIER FOR A SUBSTRATE INJECTION ORIFICE

(75) Inventors: Douglas S. McBain, Wadsworth, OH (US); John A. Thompson, Wooster, OH (US); Elliott J. Straus, Akron, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 730 days.

(21) Appl. No.: 10/150,128

(22) Filed: May 16, 2002

(65) Prior Publication Data

US 2003/0077425 A1 Apr. 24, 2003

Related U.S. Application Data

(63) Continuation-in-part of application No. 10/045,481, filed on Oct. 22, 2001.

(51) Int. Cl.
*B32B 27/36* (2006.01)

(52) U.S. Cl. ............... 428/412; 428/411.1; 528/196
(58) Field of Classification Search .......... 428/411.1, 428/412; 528/196
See application file for complete search history.

(56) References Cited

U.S. PATENT DOCUMENTS

| | | |
|---|---|---|
| 4,076,788 A | 2/1978 | Ditto |
| 4,081,578 A | 3/1978 | Van Essen et al. |
| 4,189,517 A | 2/1980 | Shanoski et al. |
| 4,222,929 A | 9/1980 | Shanoski et al. |
| 4,316,869 A | 2/1982 | Van Gasse |
| 4,331,735 A | 5/1982 | Shanoski |
| 4,350,739 A | 9/1982 | Mohiuddin |
| 4,366,109 A | 12/1982 | Svoboda |
| 4,414,173 A | 11/1983 | Cobbledick et al. |
| 4,515,710 A | 5/1985 | Cobbledick |
| 4,668,460 A | 5/1987 | Ongena |
| 4,798,697 A | 1/1989 | Nohara et al. |
| 4,921,669 A | 5/1990 | Vetter et al. |
| 4,963,312 A | 10/1990 | Müller |
| 5,053,177 A | 10/1991 | Vetter et al. |
| 5,084,353 A | 1/1992 | Cobbledick et al. |
| 5,132,052 A | 7/1992 | Cobbledick et al. |
| 5,359,002 A | 10/1994 | Cobbledick et al. |
| 5,391,399 A | 2/1995 | Cobbledick et al. |
| 5,496,509 A | 3/1996 | Yamamoto et al. |
| 5,562,979 A | 10/1996 | Easterlow et al. |
| 5,614,581 A | 3/1997 | Cobbledick et al. |
| 5,632,949 A | 5/1997 | Fisher et al. |
| 5,639,403 A | 6/1997 | Ida et al. |
| 5,658,672 A | 8/1997 | Lenke et al. |
| 5,736,090 A | 4/1998 | Yamamoto et al. |
| 5,777,053 A | 7/1998 | McBain et al. |
| 5,882,559 A | 3/1999 | Eckardt et al. |
| 5,902,534 A | 5/1999 | Fujishiro et al. |
| 5,906,788 A | 5/1999 | Boeckler |
| 6,180,043 B1 | 1/2001 | Yonemochi et al. |

FOREIGN PATENT DOCUMENTS

| | | |
|---|---|---|
| EP | 0 625 418 A1 | 11/1994 |
| FR | 2 395 135 | 1/1979 |
| WO | WO 01/07230 A1 | 2/2001 |
| WO | PCT/CA01/00534 | 4/2001 |

OTHER PUBLICATIONS

Patent Abstract of Japan, vol. 1997, No. 06, Jun. 30, 1997 & JP 09 052262.

U.S. patent application Ser. No. 60/198,691, Brett, filed Apr. 20, 2001.

Long Fiber Reinforced Thermoplastics, *Injection Molding Guide*, Caistran, 1999, pp. 1–27.

GE Injection Molding Mold Design, *GE Engineering Thermoplastics Injection Molding Processing Guide*, General Electric, 1998, pp. 1–1—1–24.

GE Injection Molding Processing, *GE Engineering Thermoplastics Injection Molding Processing Guide*, General Electric, 1998, pp. 2–1—2–12.

GE Injection Molding Troubleshooting Guide, *GE Engineering Thermoplastics Injection Molding Processing Guide*, General Electric, 1998, pp. 3–1—3–7.

The Sabreen Group, Inc.'s "Preparing Plastics for Painting" article.

Chlorocarbons and Chlorohydrocarbons–$C_2$ to Combustion Technology, Kirk–Othmer *Encyclopedia of Chemical Technology*, Fourth Edition, vol. 6, (1993), pp. 676–690.

GE Plastics Processing Guide, *GE Engineering Thermoplastics Injection Molding Processing Guide*, General Electric, 1998, pp. i–iv.

*Primary Examiner*—Terressa Boykin
(74) *Attorney, Agent, or Firm*—Fay, Sharpe, Fagan, Minnich & McKee, LLP (57) ABSTRACT

A substrate having a barrier comprising a raised rim to prevent an in-mold coating from flowing into a gate pin assembly or substrate injection inlet area wherein a substrate is injected into the mold cavity. The barrier prevents cross contamination between a substrate resin orifice and the in-mold coating. A method for isolating an injection inlet area or gate pin assembly from in-mold coatings is also described.

29 Claims, 7 Drawing Sheets

IN-MOLD COATING BARRIER FOR A SUBSTRATE INJECTION ORIFICE

CROSS REFERENCE

This application is a continuation-in-part of prior application Ser. No. 10/045,481, filed Oct. 22, 2001, entitled "Selectively Controlling In-Mold Coating Flow."

FIELD OF THE INVENTION

The present invention discloses a mold structure for use in conjunction with a substrate injection device having a substrate injection orifice such as a gate pin and associated assembly to control the flow of a substrate polymer or resin into a mold cavity.

More specifically, the mold structure, and thus the injected substrate which is formed in the mold structure, cooperate to provide a barrier to prevent a subsequent application of an in-mold coating from flowing into the substrate injection orifice or gate pin assembly. The molded substrate which prevents in-mold coating flow to a gate pin assembly is also described. A method for isolating a substrate injection orifice or gate pin assembly from an in-mold coating is additionally detailed.

The present invention relates to a method for coating a molded article or substrate with an in-mold composition, wherein the flow and thus the thickness of the in-mold composition onto the substrate can be selectively controlled. Importantly, desired areas of molded articles can be preferentially coated with in-mold coating compositions by controlling the thickness or depth of various sections of the substrate. Advantageously, the method of the present invention can be utilized to mold articles of relatively complex shape or design which have an in-mold coating thereon having a uniform or desired appearance.

In one embodiment of the present invention, a molded article is provided with an area of increased relative thickness at the location of in-mold coating injection in order to encourage or promote in-mold coating flow.

In yet another embodiment of the present invention, a molded article or substrate is provided with at least one runner section or preferred flow channel to promote in-mold coating flow over the surface of a substrate.

Still another embodiment of the present invention involves providing a molded article or substrate with an in-mold coating containment flange which acts as a barrier and prevents the in-mold coating from leaking or seeping off of the desired surface and out of the mold cavity. The in-mold coating containment flange extends substantially completely around the perimeter of a molded substrate surface where the in-mold coating has been applied thereto.

BACKGROUND OF THE INVENTION

Molded thermoplastic and thermoset articles, such as those made from polyolefins, polycarbonate, polyester, polyethylene, polypropylene, polystyrene and polyurethanes, are utilized in numerous applications including those for the automotive, marine, recreation, construction, office products, and outdoor equipment industries. For example, automotive industry applications include body panels, wheel covers, bumpers, head and tail lamps, fenders, hoods, and dashboards.

Use of the molded articles is not without problem, as the surface quality may not meet required standards, such as durability, chemical resistance, and weather resistance. In many instances, the molded thermoplastic articles may need to be coated to satisfy the above-noted requirements or to facilitate paint adhesion.

Countless methods have been developed to apply various coatings to the molded articles to improve the surface characteristics thereof.

Previously, molded work pieces were formed in a mold, the molded product removed, and a coating was then applied on the surface of the molded work piece by a coating process, such as a surface treatment, primer coating, top coating, painting, etc. Hence the foregoing methods required an additional step to achieve a finished surface on a work piece, i.e. treating the surface of the pre-formed work piece prior to applying a paint or coating. These methods required additional steps and increased costs of preparing the molded work piece surface.

It became desirable, therefore, to have a method by which a coating could be applied to a work piece in the mold, resulting in a coated work piece the surface of which would be finished and suitable for use as is in an end use application, or which would require less or no surface preparation treatment than heretofore utilized.

The application of in-mold coatings (IMC) to thermoplastic or thermoset materials to provide generally smooth surfaces, improve durability and other surface properties, and to reduce or eliminate substrate porosity is known. A number of in-mold coating methods have been employed for applying coatings, in compression molding methods or injection molding methods employing molding materials of thermosetting resins, such as SMC (sheet molding compound) and BMC (bulk molding compound) (e.g., U.S. Pat. Nos. 4,076,788; 4,081,578; 4,331,735; 4,366,109; and 4,668,460).

Heretofore, the in-mold coatings which have been applied to molded articles typically covered the entire surface of the article. The coverage of the coating was controlled by only the amount of coating applied, such as in the case of an undershot, or possibly the physical boundaries of the mold cavity.

Often, an in-mold coating is applied to the same side of a molded article from which the substrate material was injected. The injected in-mold coating will seek the path of least resistance and thus flow into generally any orifice or opening, including the substrate injection orifice. Accordingly, the in-mold coating can flow into the gate pin of an injection device and infiltrate the same, contaminating the substrate resin therein. It would therefore be desirable to provide a barrier to prevent an in-mold coating from accessing a substrate injection orifice such as a gate pin assembly. The present invention device or structure may also be used in a mold which has an insulated runner, hot runner or the type of runner normally referred to as a sprue.

SUMMARY OF THE INVENTION

The present invention relates to a mold structure and a molded substrate design which provide a barrier or restraint to prevent an in-molding coating from flowing into a substrate injection orifice such as a gate pin assembly of an injection device. Gate pin assemblies are typically utilized to control flow of resin from a thermoplastic or thermoset injection molder into a mold cavity. Heretofore, in-mold coatings supplied to the surface of a substrate to coat the same have been able to flow into substrate injection orifice passageways such as gate pin assemblies and contaminate the thermoplastic or thermoset substrate injection device. A method for isolating a substrate injection orifice such as a gate pin assembly from an in-mold coating is also disclosed.

An improved method for applying in-mold coatings has been developed, whereby molded articles can be preferentially coated in desired area, and depth of coating can be regulated by selectively controlling the thickness of sections of the article.

The present invention also relates to a method for preferentially in-mold coating a molded article or substrate in at least one predetermined area based upon the thickness or depth of the article. A first composition is molded into an article or substrate in a mold, preferably by injection molding techniques known in the art. A second composition is applied to the substrate in-mold, wherein the second composition is directed to at least one predetermined area of the substrate based on the compressibility thereof.

Molded substrates often have complex designs or configurations and heretofore, it has been difficult or impossible to produce an in-mold coated article which has been properly or fully coated to desired specifications.

Advantageously, it has been found that the flow of in-mold coating over an article can be effectively controlled, whereby the coating can be channeled or routed so that the coating on the substrate surface conforms to design specifications. The in-mold coatings are preferably channeled by providing the substrate with areas of varying thickness or depth below the surface to be coated. It has been found that substrate areas of greater depth promote in-mold coating flow relative to less thick areas. The present invention also teaches a method for controlling the thickness of an in-mold coating on a substrate.

The present invention provides a method for producing molded articles with coatings in predetermined areas which are suitable for use as-is in an end use application or which require minimal or no surface post-treatment.

A further object of the present invention is to eliminate the need of applying additional paint or other surface treatment coatings to a surface of a pre-formed work piece.

Yet another object of the present invention is to provide a work piece having an appearance in-mold coating thereon, which has paint-like properties, such as high gloss, hardness, good adhesion and good weatherability.

A further object of the present invention is to provide a work piece having an in-mold coating thereon, which has good flow and coverage during molding, good adhesion, uniform color, durability, weather resistance, good surface qualities, and good paintability.

In one embodiment of the present invention, a molded article is provided with an area of increased relative thickness at the location of in-mold coating injection in order to encourage or promote in-mold coating flow.

In yet another embodiment of the present invention, a molded article or substrate is provided with at least one runner section or preferred flow channel to promote in-mold coating flow over the surface of a substrate.

Still another embodiment of the present invention involves providing a molded article or substrate with an in-mold coating containment flange which acts as a barrier and prevents the in-mold coating from leaking or seeping out of the mold cavity. The in-mold coating containment flange extends substantially completely around the perimeter of a coated molded substrate surface.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The present invention relates to producing a molded article or substrate having a coating bonded thereto. The coating is present on the surface of the substrate in a predetermined area or areas. The substrate includes a barrier structure which prevents the in-mold coating from leaking or otherwise accessing a substrate injection orifice such as a gate pin assembly. The form of the barrier may vary but can generally be described as having a projection, raised perimeter or element extending completely around the substrate injection orifice. In a preferred embodiment, the barrier rim element has substantially parallel walls, extending substantially perpendicularly away from a plane formed by the substrate show surface, which are terminated at substantially right angles to the mold surface. The barrier can also be tapered or angled generally from about 45° to about 90° from the barrier base, which is connected to the substrate, to a tip or distal end which has substantially less thickness than the base to a predetermined degree. The angle of the taper may incline either toward or away from the flow direction of the in-mold coating. The taper angle can vary with the composition of the substrate and the resulting modulus when the substrate is cooled below its melting point. In-mold coating thickness can also be controlled by the method of the present invention.

The method of the present invention provides a process for controlling the flow of an in-mold coating so that it can be channeled or routed on a substrate to result in a coating having a uniform thickness or appearance on a large or complex shape. The in-mold coating can be channeled to coat an entire surface of a substrate or only selected areas thereof.

The method of the present invention can generally be practiced on any molding apparatus such as an injection molding machine capable of producing a molded article or substrate of a first composition and then coating the article or substrate with a second composition, i.e. an in-mold coating.

Figure 1:
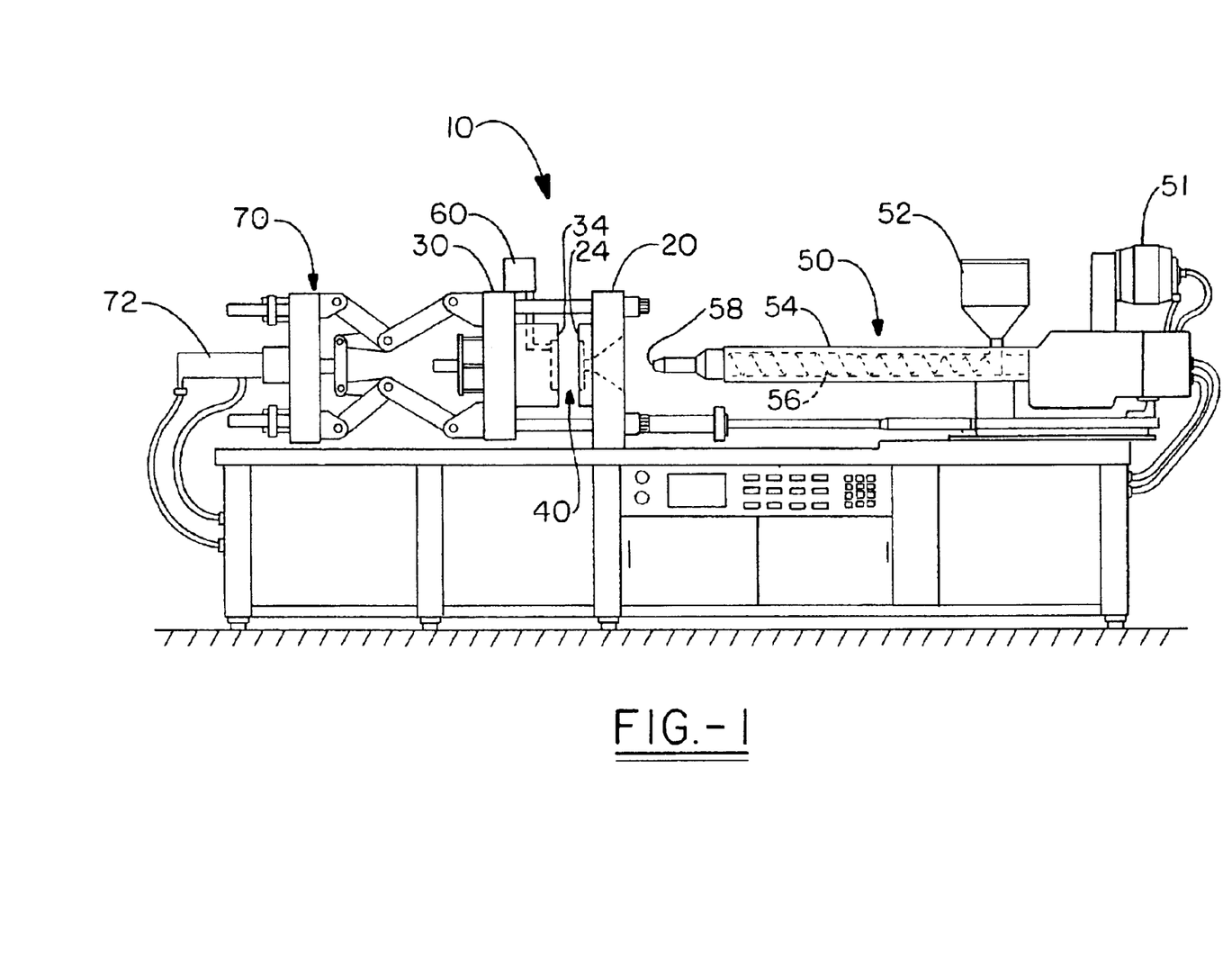
FIG. 1 is a side view of one embodiment of a molding apparatus suitable for practicing the method of the present invention.

Making reference now to the drawings wherein like numerals indicate like or corresponding parts throughout the several figures, a molding apparatus suitable for the practice of the present invention is shown in FIG. 1, and is generally designated 10. While one particular embodiment of a molding apparatus is described herein, it is to be understood that any of the devices as known in the art can be utilized to practice the present invention.

Molding apparatus 10 includes a first mold half 20 which preferably remains in a stationary or fixed position relative to a second moveable mold half 30. FIG. 1 shows the mold halves in an open position. The first mold half and second mold half are adapted to mate, or abut, thereby forming a mold cavity 40 therebetween as shown in at least FIG. 2. The mold halves are generally formed from metal by machining or electrodeposition as known in the art. The mold halves mate along surfaces 24 and 34 (FIG. 1) when the molding apparatus is in the closed position, forming a parting line 42 (FIG. 2) therebetween.

The moveable mold half 30 reciprocates generally along a horizontal axis relative to the first or fixed mold half 20 by action of a clamping mechanism 70 with a clamp actuator 72 such as through a hydraulic, mechanical, or electrical actuator as known in the art. The clamping pressure exerted by the clamping mechanism 70 should have an operating pressure in excess of the pressures generated or exerted by the first composition injector and the second composition injector. The pressure exerted by the clamping mechanism ranges generally from about 2,000 to about 15,000, desirably from about 4,000 to about 12,000, and preferably from about 6,000 to about 10,000 pounds per square inch (psi) of mold surface.

Figures 2, 3:
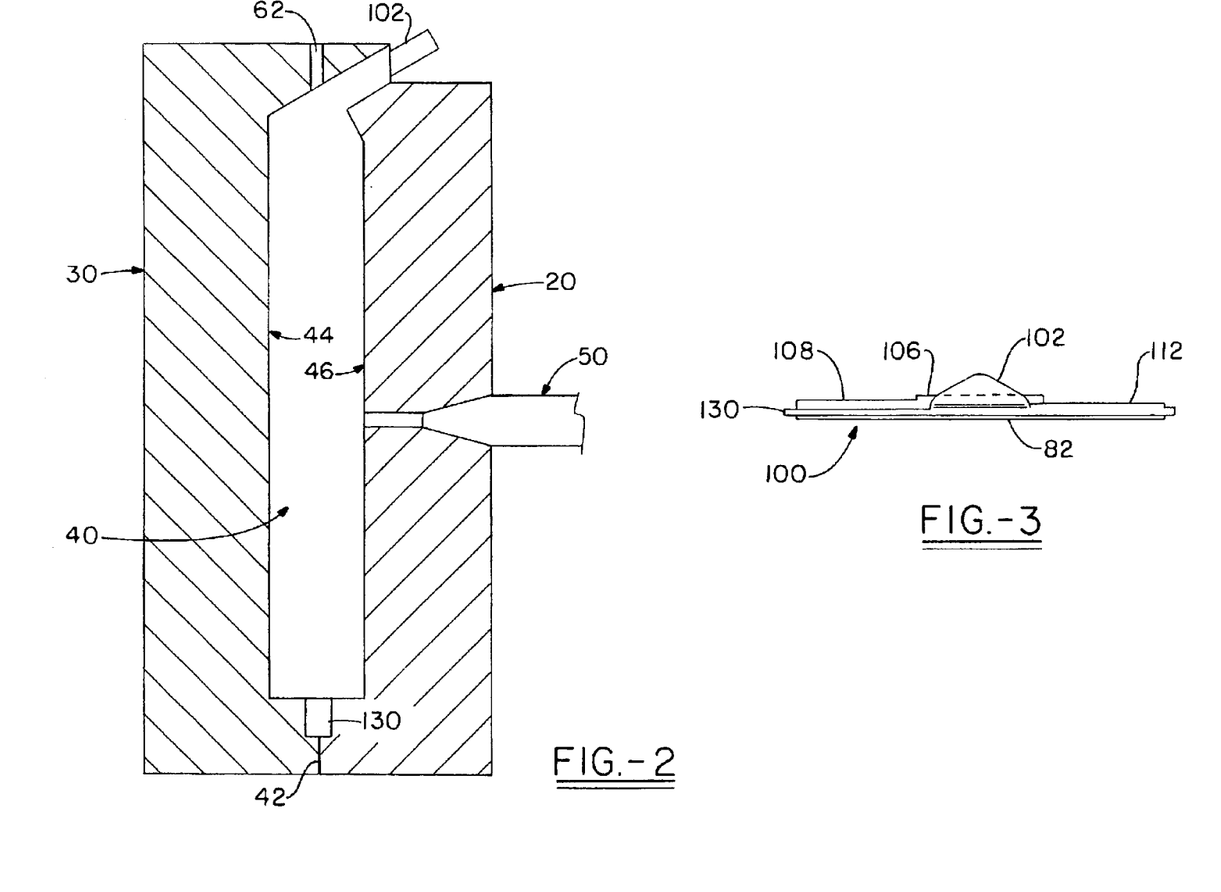
FIG. 2 is a cross section through a vertical elevation of a mold cavity.
FIG. 3 is a top view of a molded substrate prior to being coated with an in-mold coating. The substrate is shown having an area of increased thickness in order to promote and/or channel in-mold coating flow.

In FIG. 2, the mold halves 20 and 30 are shown in a closed position, abutted or mated along parting line 42 at face surfaces 24 and 34. As illustrated, the mold cavity is shown in cross section. It is readily understood by those skilled in the art that the design of the cavity can vary greatly in size and shape according to the end product to be molded. The mold cavity generally has a first surface 44 on the first mold half, upon which a show surface of an article will be formed, and a corresponding back side or opposite second surface 46 on the second mold half. The mold cavity also contains separate orifices to allow the first and second composition injectors to inject their respective compositions thereinto. The location of the injectors and injection orifices thereof can vary from apparatus to apparatus, and part to part, and can be based on factors such as efficiency, functionality, or desire of the mold designer.

As shown in FIG. 1, the first composition injector 50 is a typical injection molding apparatus which is well know to those of ordinary skill in the art and is capable of injecting a thermoplastic or thermosetting composition, generally a resin or polymer, into the mold cavity. The first composition injector is shown in a "backed off" position, but it is readily understood that the same can be moved to a horizontal direction so that nozzle or resin outlet 58 mates with mold half 20 and can inject into mold cavity 40. For purposes of illustration only, the first composition injector in FIG. 1 is a reciprocating-screw machine wherein a first composition can be placed in hopper 52 and rotating screw 56 moves the composition through the heated extruder barrel 54, wherein the material is heated above its melting point. As the material collects in the end of the barrel, the screw acts as an injection ram and forces it through the nozzle 58 into the mold cavity 40. The nozzle generally has a non-return valve at the nozzle or screw tip to prevent the backflow of material into the screw.

The first composition injector is not meant to be limited to the embodiment shown in FIG. 1 but can be any apparatus capable of injecting a thermoplastic composition into the mold cavity. Suitable injection molding machines are available from Cincinnati Milacron, Battenfeld, Engel, Husky, Boy and others.

The present invention for selectively controlling the flow of in-mold coatings can be practiced on generally any thermoplastic substrates which can be injection molded. Suitable thermoplastic substrates, include but are not limited to polyethylene terephthalate (PET), nylon, acrylonitrile butadiene styrene (ABS), polystyrene, polycarbonate, acrylic, acetal, polyolefins such as polyethylene and polyethylene, polypropylene, and polyvinyl chloride (PVC). The foregoing list is not meant to be exhaustive but only illustrative of the various materials useful in the practice of the invention.

It has been found that a surface of the substrate can be selectively coated with in-mold coatings in predetermined areas by controlling or modifying the thickness or depth of the substrate. When utilized in the present invention, thickness or depth is defined as a distance, girth, or dimension from one surface to the opposite surface of the substrate. The method of the present invention is generally concerned with the depth between two surfaces, the first being a surface to which an in-mold mold coating is selectively directed or applied, commonly referred to as a show or appearance surface, and the back surface that is substantially the opposite side of the substrate. The in-mold coating may but does not necessarily cover the entire show surface. For example, in FIG. 3 thickness refers to the distance from show surface 82 of a substrate to the backside or opposite surface 84. As shown in FIG. 3, the thickness between the show surface and back side of the substrate can vary.

Each substrate of the present invention inherently has a compressibility factor or percentage, wherein at a given temperature each specific substrate is compressible to a certain calculable percentage. Therefore, even though a molded article or substrate has a single compressibility ratio, a first area of a substrate which is thicker relative to a second area of the substrate will be able to compress a greater thickness or distance than the second substrate. For example, substrate "A" has a compressibility ratio of 20 percent at a certain temperature. Therefore, a portion of substrate "A" which has a thickness of 2.0 cm can compress 0.4 cm, whereas a portion of the substrate which has a thickness of 1.0 cm can only compress 0.2 cm at the given temperature.

The above described substrate compressibility can be utilized to selectively coat predetermined areas of a substrate. Substrate compressibility can also be utilized to effectively direct the flow of an in-mold coating into certain areas or pathways of a substrate.

Figure 4:
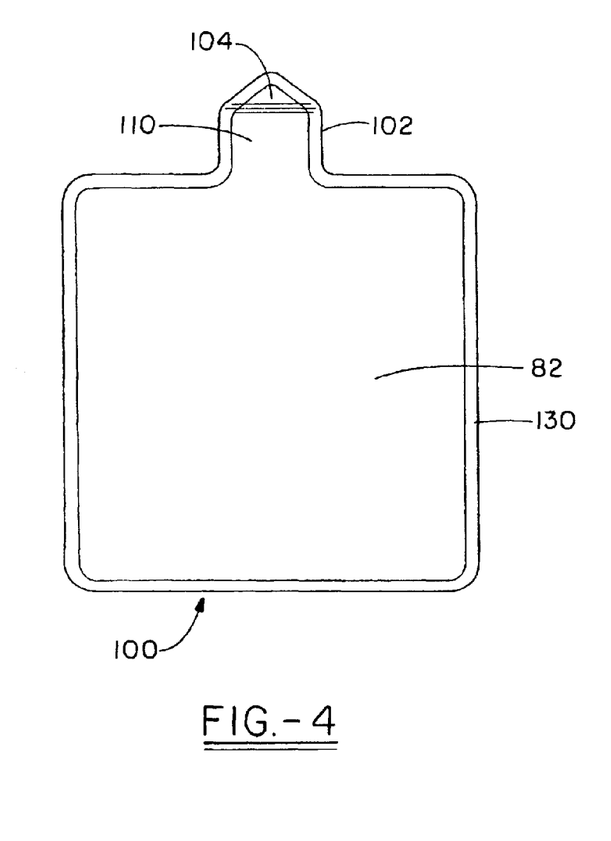
FIG. 4 is a front view of the substrate shown in FIG. 3.

In-mold coatings can be applied to a substrate in numerous ways utilizing in-mold coating devices well known to those of ordinary skill in the art. The present invention is not meant to be limited to the following example. As shown in FIG. 2, an in-mold coating or second composition injector 60 has a nozzle 62 which is located on the molding apparatus in a suitable location such as on mold half 30. A first quantity of a first composition 80 is injected into a mold cavity to a desired predetermined level, forming a substrate, work piece, or article, such as plaque 100 shown in the views of FIGS. 3–5. As shown in FIG. 3, the substrate has at least a show surface 82 and a back side 84. An in-mold coating composition 90 is then injected into the mold cavity from in-mold coating injector 60. The in-mold coating is injected through at least one nozzle 62 onto the show surface side of the substrate at a location such as 104 on tab 102 as shown in FIG. 4.

It is important to note that the mold is not opened or unclamped before and/or during in-mold coating application, that is, the mold halves maintain a parting line and generally remain a substantially fixed distance from each other while both the first and second compositions are injected into the mold cavity as described herein.

The uncured in-mold coating composition spreads out, disperses, or radiates from the point of injection 104 onto the show surface of the substrate. The point of injection of the in-mold coating onto the substrate will depend on the location of the in-mold coating injector and nozzle thereof in the molding apparatus. Accordingly, the point of injection of the in-mold coating can be located substantially anywhere on the substrate show surface and is not limited to the locations shown in the drawings of the present invention. The in-mold coating cures or hardens on the substrate surface sometime after injection, as known in the art. The cure is typically heat activated, from sources including but not limited to the molded substrate or the mold itself.

One embodiment of the present invention relates to a method for directing or channeling the flow of an in-mold coating on a substrate. Unexpectedly, it has been found that substrate compressibility can be utilized to direct in-mold coating flow for in-mold coating systems which are conducted "closed clamp", wherein the mold halves remain abutted or closed at least during the time between injection of a first composition and an in-mold coating composition. That is, the parting line between the mold halves is not separated during the molding operation in which an in-mold coated substrate is produced. When mold halves 20, 30 are closed or joined, a mold cavity 40 is formed therebetween. The mold cavity has a configuration with a specific defined volume. A predetermined amount of a first composition which will produce a desired substrate is injected into the mold cavity. By the term predetermined, it is understood by one of ordinary skill in the art that through the control of variables of the molding process, a calculated amount of material that will produce a desired substrate can be experimentally determined. After the first composition has been injected into the mold cavity and has cooled below the melt point or otherwise reached a temperature sufficient to accept or support an in-mold coating, a predetermined amount of in-mold coating is injected from injector unit 60 through at least one nozzle onto an injection point of the substrate, preferably on a show surface thereof. The coating is injected at a pressure that ranges generally from about 500 to about 5,000, desirably from about 1,000 to about 4,500, and preferably from about 2,000 to about 4,000 pounds per square inch (psi). The injection pressure promotes the spread of the in-mold coating away from the nozzle. The in-mold coating spreads from the nozzle between a mold surface and a surface of the substrate.

Unexpectedly, it has been found that by varying the thickness or depth of the resin of the substrate below the surface to be coated, the in-mold coating can be routed to preferred areas of the substrate, and contained therein, if desired. For example, if a mold cavity is designed so that a substrate has a constant thickness under an area to be in-mold coated, the in-mold coating will spread out from the location of injection in a substantially radial, even, or constant manner. Under the same relative conditions, if a substrate is formed having areas which vary in thickness under the surface area to be coated, the in-mold coating can be channeled to flow in area(s) of greater relative thickness. Thus, the depth of the coating can also vary on the coated surface. It has been demonstrated, as stated hereinabove, that the compressibility of the substrate allows a substrate area having a greater depth relative to a second area to compress more and better accommodate in-mold coating flow and promote migration thereof.

Figure 5:
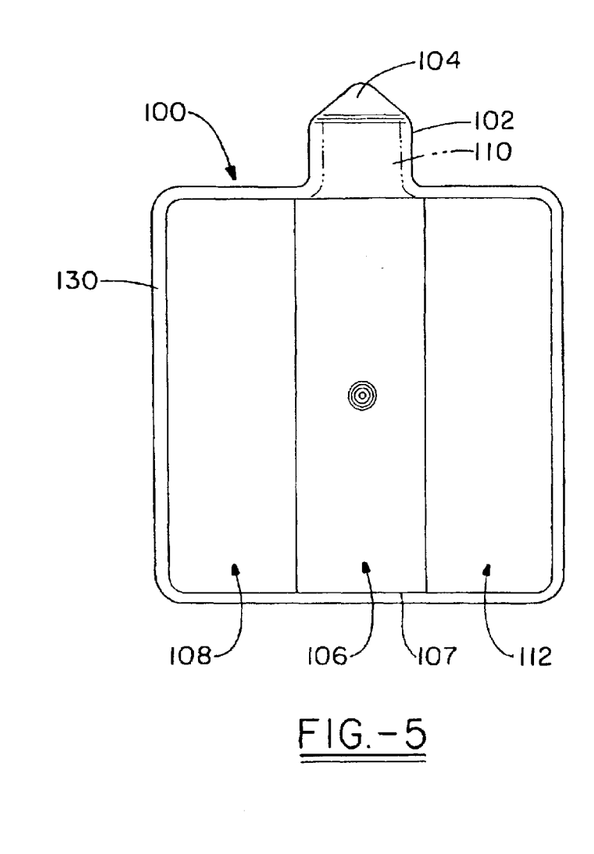
FIG. 5 is a back view of the substrate shown in FIG. 3, wherein areas of varying depth are distinctly shown.

In one embodiment of the present invention, a substrate is provided with an area or section of increased thickness around the point or location where the in-mold coating is injected onto the substrate in order to promote in-mold coating flow. By increased thickness, it is to be understood that the thickness of the substrate around the in-mold coating injection location is greater than at least one other area or section of the substrate. As shown in FIG. 5, plaque 100 is shown with a tab area 110 at a location of in-mold coating injection. The tab area thickness can be varied to enhance channeling of the in-mold coating. Tab section 104 in FIG. 4 includes a thin section or in-mold coating containment tab flange 102 which prevents the in-mold coating from flowing out of the mold cavity. The concept of the containment flange will be further explained hereinbelow. The relatively thick tab area promotes in-mold coating flow from the in-mold coating nozzle onto the show surface 80 of the substrate. The in-mold coating will tend to avoid tab or other substrate sections of minimal or lesser thickness.

Figure 6:
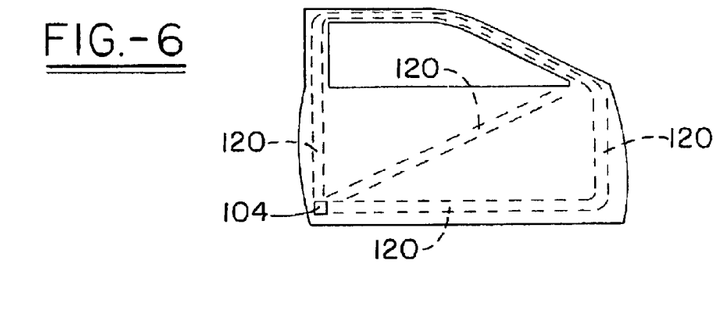
FIG. 6 is a side view of a molded door panel. The door panel is provided with areas of varying depth in order to channel in-mold coating flow over the surface so that the same is coated in desired areas in order to meet a predetermined standard.

In a further embodiment of the present invention, a substrate is provided with at least one "runner" section, preferential flow channel, or area to promote in-mold coating flow on a substrate. A runner section is an area which is relatively thicker than another area adjacent thereto, wherein the in-mold coating can be preferably routed to flow. Advantageously, runner sections can be provided on substrates of complex design or which were previously difficult to coat. A runner section generally is located in an area on the substrate beginning in the region of the point of injection of the in-mold coating and extending away therefrom to a predetermined point or terminus on the substrate. For example, FIG. 5 has a runner section 106 extending from and including the tab area to substantially the bottom end 107 of the plaque. FIG. 6 shows a door panel having three runner sections 120. By providing a substrate with at least one runner section, in-mold coatings can be effectively routed or channeled to cover desired areas of a substrate.

Depending on the amount of in-mold coating injected into the mold cavity, the show surface substrate having a runner section can be completely coated or coated only in certain areas or sections such as the runner areas. The amount of coating applied and thickness thereof can vary from part to part.

The depth of the runner section can vary depending on the substrate to be coated and design specifications. A substrate can have a runner section extending from an area of in-mold coating injection which is so relatively thick that all of the in-mold coating application to the substrate surface will substantially remain in the runner section. Therefore, as can be imagined, many unique effects can be created by utilizing runner sections. Frequently, it is desirable to completely coat the show surface with an in-mold coating. It is often difficult to coat a substrate having a complex or detailed shape. Runner sections can be used to effectively in-mold coat these substrates by channeling in-mold coating to the previously hard to coat areas. For example, a runner section can be utilized to channel a coating to a distal part of a substrate surface. The runner section thickness can be gradually decreased such as in a direction away from the point of injection as needed, or even separated or divided into more than one runner section to accomplish a desired effect or coating.

In yet another embodiment of the present invention, a molded substrate or article is provided with an in-mold coating containment flange 130. As shown in at least FIG. 4, coating containment flange preferably extends completely around the perimeter of a substrate, specifically plaque 100. Often, it is desirable to substantially coat the show surface of a substrate with an in-mold coating. The containment flange 130 acts a barrier and prevents the in-mold coating from leaking or seeping out of the mold cavity and potentially blowing out of the parting line between the mold halves.

As shown in at least FIG. 3, flange 130 is generally offset or formed in a plane below the plane of the show surface 82. Thus, the show surface has an edge or border 83 which transitions into flange 130. Show surface edge 83 drops off into a wall at an angle of about 90° relative to the show surface. Substrate wall 86 terminates at flange portion 130, wherein flange portion extends at an angle of about 90° in relation to wall 86. It is believed that the relatively sharp angles between show surface and flange 130 as well as the relative incompressibility of the thin flange act as a substantial barrier to coating flow, and thus prevent the coating from leaving the show surface. The flange generally has a thickness less than the thinnest portion or area of the substrate. As shown in FIG. 3, containment flange 130 is thinner than section 112, the relatively thinnest section of the substrate. The in-mold coating containment flange encompasses substantially the entire perimeter of a substrate surface that will be or is coated. The flange has a width of at least generally about 0.225 to about 0.176, desirably about 0.175 to about 0.076, and preferably about 0.075 to about 0.045 inches. As stated above, the main purpose of the flange is to prevent the in-mold coating from leaving the target surface of the substrate and stopping the coating from giving entrance to the mold parting line.

Figure 7:
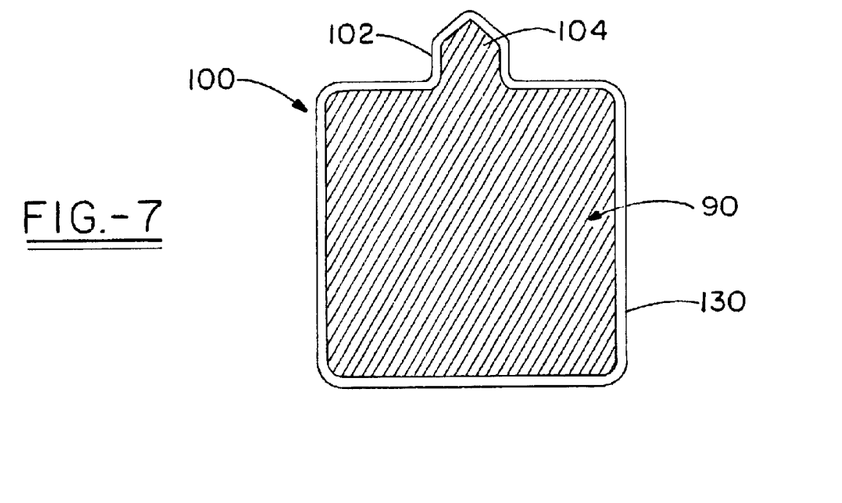
FIG. 7 is the substrate of FIG. 4 having an in-mold coating on a show surface thereof.
Figure 8:
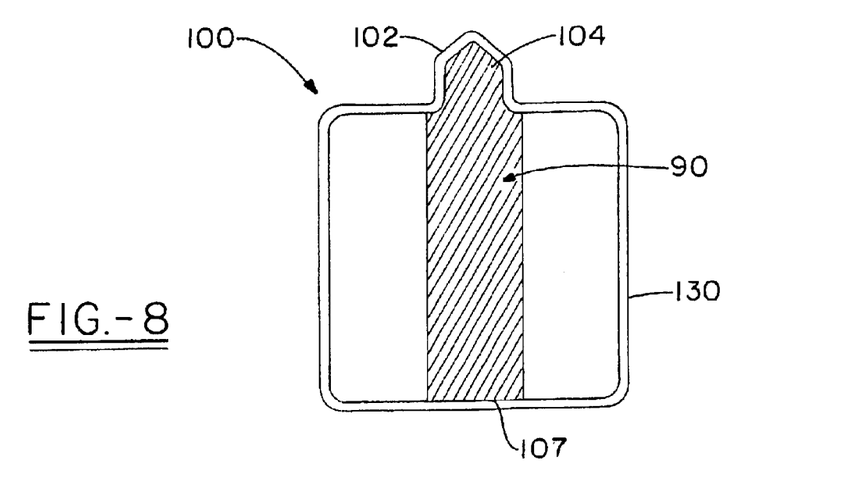
FIG. 8 is the substrate of FIG. 4 having an in-mold coating located substantially only in a runner section of the show surface.

As shown in FIG. 7, the in-mold coating 90 covers the entire show surface of the molded substrate. Due to the configuration of the molded substrate as well as other molding variables, the coating 90 does not cover or coat the containment flange 130. However, it is permissible for the in-mold coating to coat or partially coat the containment flange. Due to the design of the containment flange, generally less than about 10%, desirably less than 5%, and preferably less than 1% by weight of the in-mold coating covers or coats the containment flange. The containment flange is free of any other substrate material on the distal edge thereof. This is, there is no other substrate material or outer edge between the containment flange and the mold cavity parting line.

In a further embodiment of the present invention, an in-mold coating barrier, projection, flange, barrier element, or dam structure is provided on a substrate in order to prevent the coating from entering or flowing into an orifice, typically having a gate pin, which leads to a substrate injection molding device, and contaminating the same. As described hereinabove and shown in at least FIGS. 1 and 2, an in-mold coating apparatus includes a first composition injector 50 which is capable of injecting a thermoplastic or thermosetting substrate composition into a mold cavity 40 through at least one orifice, outlet, or opening. After a substrate composition has been molded in the mold cavity, an in-mold coating is injected onto a surface of the molded substrate. Often, the in-mold coating is injected onto a substrate surface on the same side where at least one inlet orifice of the substrate injector is located. Substrate injection orifices having a) gate pins, b) non-return valves, c) other mechanical, hydraulic or pneumatic devices which control a gate and thus the flow of resin into the molding cavity, or d) mold runners without such a device, and the like, have been found ineffective to prevent uncured in-mold coating from passing therethrough and subsequently entering and contaminating a non-in-mold coating composition, i.e. substrate composition in an injection device. Resultant problems of in-mold coating flow through a substrate injection orifice include contaminated substrate material or injection molder inner surfaces, adhesion of the degraded substrate to the surface of the mold, a build up of in-mold coating which affects the functioning of the gate pin or other substrate flow control device, and production of an article which is not suitable for use as an end product.

Accordingly, a barrier structure or element is provided in a mold and hence a molded substrate to block or prohibit an in-mold coating from access to a substrate material injection site through an orifice which can include a gate pin or similar structure. As is known in the art, the substrate material injection orifice allows resin such as a thermoplastic to flow into the mold cavity from an injection device. A gate pin or like apparatus to control substrate flow may be operated by any of several means such as, but not limited to, pneumatic pressure, hydraulic pressure, injection pressure, or mechanical operation. The design of the gate pin or similar structure is not critical. Typical gate pins are substantially round or cylindrical in design, but other designs can be utilized. Travel clearance for a gate pin from a surrounding housing device or gate tip which has an orifice opening is generally from about 0.0005 (0.0127 mm) inches to about 0.10 (2.5 mm) inches and preferably about 0.001 (0.0254 mm) inches.

Figure 11:
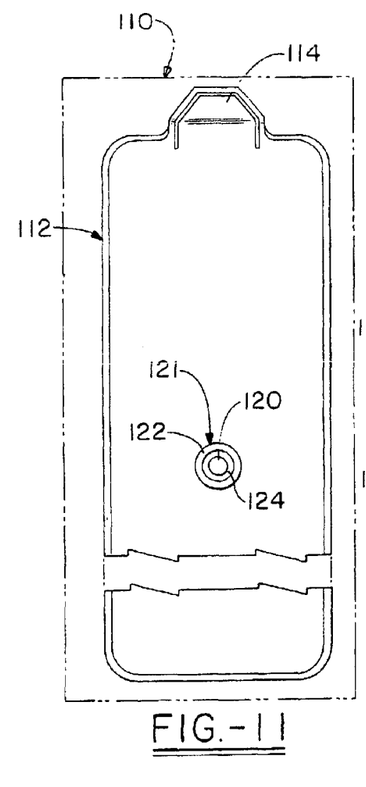
FIG. 11 is a partial elevational view of a mold half having a barrier around a gate pin apparatus for preventing an in-mold coating from entering a substrate injection device through the gate pin.

The in-mold coating substrate injection orifice generally comprises a flange, projection, or raised or standing rim 142 of substrate material around the outer perimeter of a substrate injection site 144 of substrate material located within the perimeter. The barrier utilizes the compressibility of the substrate to create a compression differential in order to isolate the injection site and substrate injection orifice opening from the in-mold coating. FIG. 11 illustrates a mold half 110 including a plaque relief 112 formed into the mold half. While one embodiment, i.e. a plaque, is shown, it is to be understood that any other design as known to those of ordinary skill in the art can be formed in the mold half and be used in conjunction with a second mateable mold half to produce a desired article. Also illustrated is an area of in-mold coating injection 114, a gate pin 120, and barrier forming relief 121. The barrier forming relief comprises a cavity 122 which extends completely around the perimeter of the gate pin, surrounding the same. The barrier relief further comprises a substrate injection element or area 124.

In order to produce a substrate with a barrier having a rim, the mold half cavity 122 is formed as a depression or indent as the molded substrate is a negative relief of the mold cavity. That is, when a substrate material is injected into the mold cavity, a substrate will be formed having features shaped as an opposite or negative form of the features present in the mold halves. The barrier rim on the molded substrate assumes the form designed in the mold surface cavity.

Figure 12:
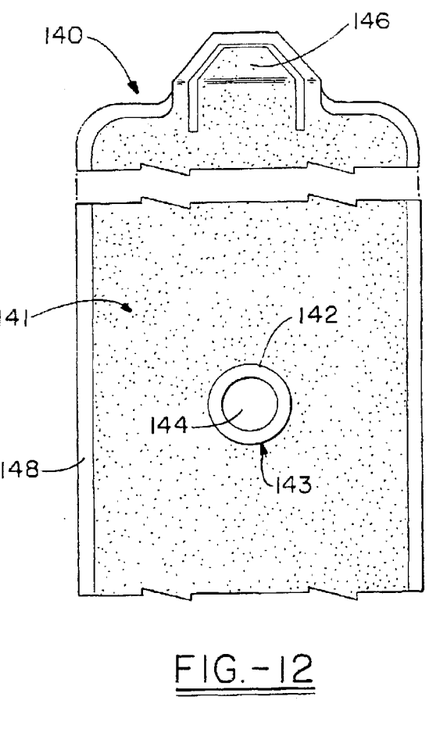
FIG. 12 is a partial elevational view of an in-mold coated substrate having a barrier of the present invention which protects a substrate injection orifice from in-mold coating.

FIG. 12 illustrates an in-mold coated 141 plaque substrate 140 which was molded utilizing a mold comprising mold half 110 shown in FIG. 11. The substrate 140 includes barrier 143 comprising a barrier rim of substrate material 142, a substrate injection element or area 144 and an in-mold coating injection area 146. A containment flange 148 as described hereinabove is also shown. The substrate has been coated in-mold with coating 141. As can be seen, the substrate injection inlet area 144 is free of the in-mold coating due to the presence of the barrier 143 of the present invention.

As shown in FIG. 12, the barrier rim 142 extends around the perimeter of the substrate injection area 144 and thus completely surrounds the same. The barrier rim 142 contains a portion or protrusion which is raised or elevated when compared to the surface of the substrate adjacent thereto, outside of the barrier rim perimeter. Typical substrate injection orifices are generally round or cylindrical. Accordingly, the barrier rim 142 is also formed as a complementary shape around the orifice and can be an annulus or ring etc. The barrier rim is not meant to be limited thereto, but can generally be any shape, e.g. square, triangular, etc., so long as the barrier rim surrounds the area of the substrate where the substrate has originated from, i.e. the substrate injection site 144.

The elevation or height of the barrier rim and other portions of the substrate for the purposes of the invention will be measured from one side of the substrate to the other, such as from the show surface to the back or opposite surface, i.e. between the corresponding mold halves, as described hereinabove. The rim height or thickness as described herein refers to a maximum height unless specifically stated. The character Y in FIG. 13B illustrates the height of the barrier rim 142 which is substantially the same throughout its width which is designated Z. The barrier rim height Y in conjunction with width Z is designed to substantially prevent the in-mold coating 141 from flowing into the substrate injection inlet area 144 as shown in at least FIG. 13C. The in-mold coating is believed to be prevented from flowing into the substrate injection inlet area in the following manner. After the in-mold coating is injected onto a substrate 140 surface such at in-mold coating injection inlet area 146 in FIG. 12, the coating flows or spreads out across the surface between a mold cavity surface and the substrate surface at least by compressing the substrate. Eventually, the in-mold coating 141 reaches the base of the barrier rim as shown in FIG. 13C. The in-mold coating will attempt to flow up the height of the barrier rim 142 by compressing the width Z of the rim. The pressure on the barrier rim by the in-mold coating 140 forces the barrier rim substrate rim away from the coating towards the mold cavity surface 111 (shown in FIG. 13A). The width Z of the barrier rim is relatively thin and thus is sufficient to prevent the in-mold coating 141 from flowing into the substrate injection inlet area 144 as shown in FIG. 13C at least because the rim width is relatively incompressible and forms an in-mold coating seal or barrier to coating flow. That is, the in-mold coating will not flow from a substrate area having a greater thickness or depth to an area of relatively less thickness if a sufficient ratio of compression differential is maintained.

Figure 15A:
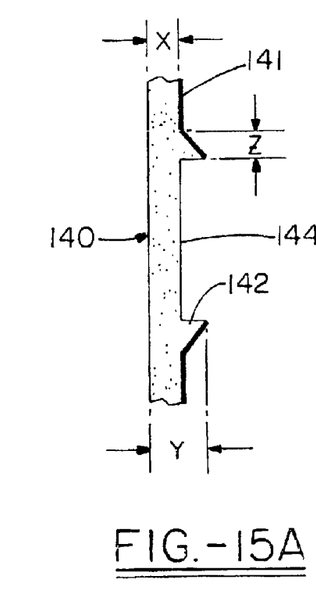
FIGS. 15A through 15C are partial cross-sectional views through an in-mold coated substrate having barrier rims of varying configurations.

The width Z of the barrier rim can even be made sufficiently thin so that the in-mold coating will not flow onto the rim itself, much less the substrate injection inlet area. Accordingly, the ratio of the barrier rim width Z to the height X of the substrate (as shown in FIG. 15A) adjacent to the barrier (measured from one substrate surface to a back side surface) ranges generally from about 0.10:1 to about 2:1, desirably from about 0.25:1 to about 1:1 and preferably about 0.50:1 or from about 0.35:1 to about 0.80:1. The required compression differential can vary depending on substrate composition, mold temperature and part design, etc., and can be readily determined through experimentation as known to those of ordinary skill in the art after reading this specification and incorporating the teachings herein in a similar process.

The differences in the height ratio between the barrier rim height Y (142 in FIG. 12) and the substrate injection inlet area or element (144 in FIG. 12) thickness are also sufficient to prevent the in-mold coating from gaining entrance to, or breaching the substrate injection area or orifice, and ranges generally from about 1.05:1 or 1.50:1 to about 5:1 or about 10:1, as is desirably from about 1.75:1 to about 2.50:1 or about 3:1, and is preferably about 2:1. The height of the substrate injection inlet area 144 to the remainder of the substrate outside the barrier rim 145 is generally from about 0.25:1 to about 4:1, and preferably 1:1. It has been found that the in-mold coating can better flow into substrate areas of greater compressibility and the converse is true of areas of less compressibility, i.e. a coating will not flow into an area of decreased thickness when the above defined ratios are met.

Figure 13A:
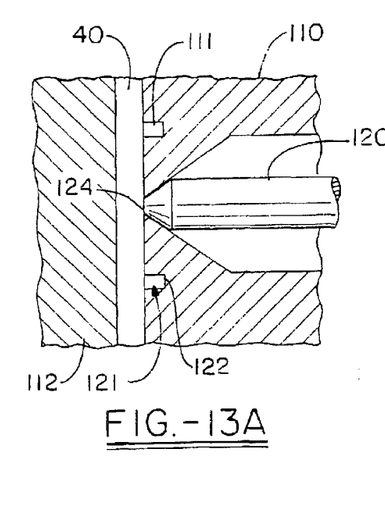
FIGS. 13A–C are partial cross-sectional views through a mold illustrating a gate pin and a barrier for in-mold coating flow.
Figure 13B:
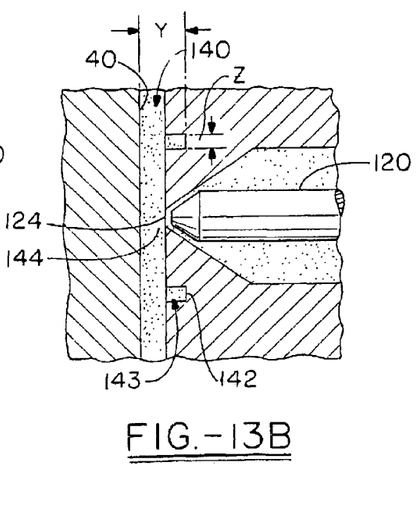
Figure 13C:
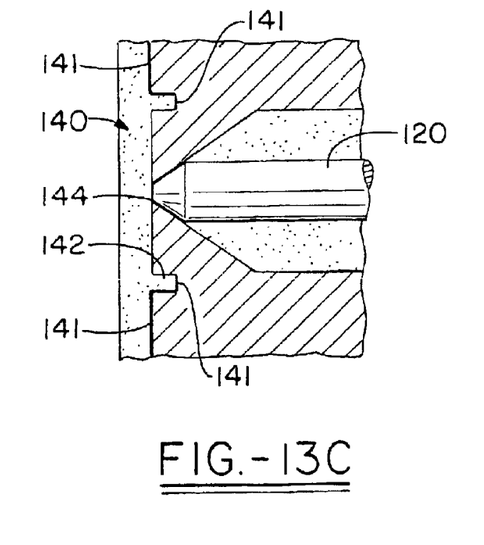

FIGS. 13A through 13C illustrate a process for forming the substrate injection orifice barrier of the present invention and show a cross-sectional view through a portion of a mold assembly similar to the apparatus shown in at least FIG. 1 and described hereinabove. FIG. 13A shows a partial view of a mold cavity 40 interposed between first and second mold halves 110 and 112 respectively. In FIG. 13A the mold cavity is also shown having barrier forming relief 121 including rim 132. A thermoplastic substrate composition is injected into mold cavity 40 at substrate injection inlet area or element 124 when the gate pin 120 is backed away from the entrance as shown in FIG. 13B. As described above, the gate pin is merely one example of a substrate inlet control.

During a typical molding cycle, the gate pin 120 is backed away from inlet 144 as shown in FIG. 13B, allowing a thermoplastic or thermosetting substrate material 140 to flow into mold cavity 40 filling the same to a predetermined level. As can be seen, the barrier 143 including barrier rim 142 is also formed with the substrate material. After a sufficient amount of the substrate material has been injected, the gate pin 120 is moved into a closed position as shown in FIG. 13C to stop the flow of substrate material. After the substrate material has cooled, achieves a suitable modulus, or otherwise is capable of accepting an in-mold coating on the surface thereof, the coating is injected into the mold cavity on the same surface from which the substrate material has also been injected. Upon injection the in-mold coating 141 flows across the surface of the substrate until it encounters barrier 143. Upon reaching the barrier rim 142, the in-mold coating compresses the rim width against the mold cavity and ceases to flow into the substrate inlet area or substrate injection orifice at least because the relative compressibility of the substrate barrier rim width along the height thereof.

Figure 14:
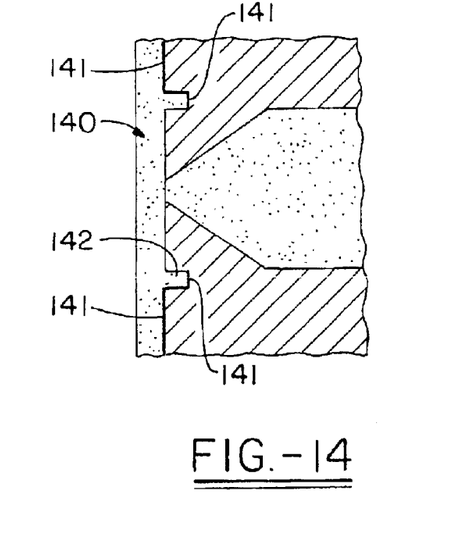
FIG. 14 is a partial cross-sectional view through a mold illustrating a coated substrate having a barrier which prevents in-mold coating flow through a substrate injection orifice.

Thus, as shown in FIG. 13C the in-mold coating 141 is prevented from reaching or flowing to gate pin 120 and passing between the gate pin and surrounding clearances into the substrate injection molder. FIG. 14 illustrates an in-mold coating barrier for a substrate injection apparatus without a gate pin. Accordingly, the present invention provides a barrier for substrate injection orifices, having gate pins or the like, to in-mold coating flow. As shown in FIG. 14, even though a gate pin may not be utilized, the in-mold coating would still be prevented from entering the substrate injection molder as the in-mold coating cannot access the substrate injection inlet area due to the presence of the barrier.

Figure 15B:
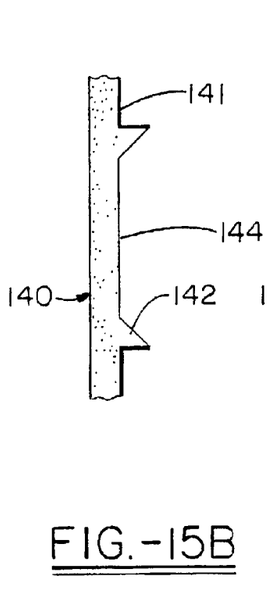
Figure 15C:
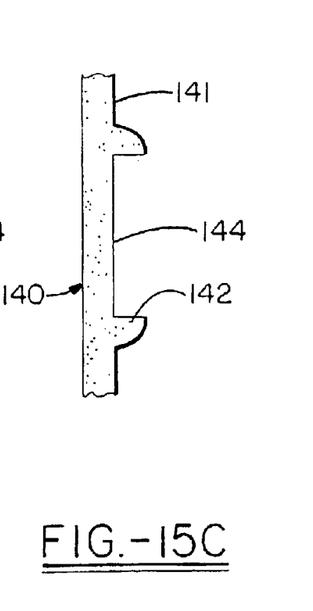

As stated hereinabove, the barrier rim may have both varying heights and or widths and thus may have many different shapes or designs other than the barrier rim shown in FIGS. 13B, 13C, and 14 which has two substantially equal height walls formed at substantially perpendicular 90° angle to the substrate main surface and a substantially constant width. FIG. 15A illustrates an alternative barrier design having tapered rim 142. The tapered rim has a varying height Y and width Z. The main portion of substrate 140 has a thickness or depth X. The rim has one wall substantially perpendicular to the substrate main surface and a slanted wall at about a 45° angle. The upper, thinnest portion of the rim is substantially incompressible by the in-mold coating and thus substantially cannot flow into the substrate injection inlet area 144. FIGS. 15B and 15C illustrate other possible variations for barrier rim design, showing a different tapered rim and a partially rounded rim.

The design of the barrier rim is only limited to mold cavity constraints wherein it is desirable to allow the substrate with barrier to be easily removed from the mold cavity after molding and coating.

The process of the present invention utilizes in-mold coatings, many of which are available commercially. Such coatings include GenGlaze® and Stylecoat®, acrylic based appearance in-mold coatings available from Omnova Solutions Inc. of Fairlawn, Ohio, as well as others. These and other coatings are well known to the art. In-mold coating injection devices well known in the art and are available commercially from $EMC^2$ of Sterling Hills, Mich., and Morrell of Auburn Hills, Mich.

The in-mold coating can be injected onto the substrate as known in the art. A predetermined amount of in-mold coating is utilized to coat the molded substrate as desired. Injection systems for in-mold coating materials are well known in the art and need not be described in detail herein. The following description of such a system is provided herein to facilitate a better understanding of the present invention. The in-mold coating apparatus 60 comprises an in-mold coating injector having a shut off pin which supplies a metered amount of a coating material. A supply pump is generally utilized to supply the in-mold coating material into a metering cylinder from a storage vessel or the like. The in-mold coating is injected from the metering cylinder into the mold cavity through in-mold coating injection inlet with a pressurizing device utilizing hydraulic, mechanical, or other pressure. When the in-mold coating apparatus is activated during an injection mode, the coating material flows through the in-mold coating injection inlet and into the mold cavity between an inner wall of mold half 110 and a surface of the molded substrate. Once a predetermined amount of in-mold coating has been injected into the mold cavity, the in-mold coating apparatus 60 is deactivated thus causing the flow of coating to cease. The in-mold coating subsequently cures in the mold cavity and adheres to the substrate surface to which the same was applied. As known in the art, the curing can be caused by the residual heat of the substrate or mold halves, or by reaction between the components of the in-mold coating. The in-mold coating is injected into the mold cavity at a pressure ranging generally from about 500 to about 5000 psi, desirably from about 1500 to about 4500 psi, and preferably from about 2000 to about 4000 psi.

Suitable in-mold coatings are found in U.S. Pat. No. 5,777,053, herein incorporated by reference. The main advantage of acrylic coatings is the high degree of resistance to thermal and photoxidation and to hydrolysis, giving coatings that have superior color retention, resistance to embrittlement and exterior durability. Low-molecular weight acrylic resins having an average functionality of two to three and containing few molecules that are nonfunctional or only monofunctional, are useful in the present invention. A preferred acrylic resin is an epoxy-based oligomer having at least two acrylate groups and at least one copolymerizable ethylenically unsaturated monomer, and at least one copolymerizable monoethylenically unsaturated compounds having a —CO—, group and a —$NH_2$—, NH, and or —OH— group.

The present invention also contemplates the use of other resin coatings, such as alkyds, polyesters, urethane systems, amino resins, phenolic resins, epoxies and silicone resins. See e.g., Kirk Othmer, Encyclopedia of Chemical Technology, Vol. 6 ($4^{th}$ ed. 1993) at pp. 676–690.

In-mold coatings comprising five components, namely
1) a saturated aliphatic polyester intermediate urethane
2) an aliphatic polyether
3) an aliphatic or cycloaliphatic portion (meth)acrylate
4) hydroxy alkyl (meth)acrylates
5) vinyl substituted aromatics
have been found to have particular utility in the practice of this invention. In-mold coating compositions are prepared as follows. The polyester urethane acrylate is mixed with the vinyl substituted aromatic monomers such as styrene, the saturated aliphatic or cycloaliphatic (meth) acrylates such as isobornyl acrylate, and the hydroxyalkyl methacrylate, such as hydroxypropyl methacrylate. After these compounds are mixed, fillers and additives, such as cure inhibitors, light stabilizers, lubricants, etc., are added and mixed. The free radical generating initiator is added last. The polyacrylate ester of a polyol can be present in the polyester urethane acrylate from the supplier. This in-mold coating composition is clear after curing.

Any of the coatings contemplated for use in the present invention can be colored by utilizing a pigment, a colorant, etc., in a desired or effective amount to yield a desired color, tint, hue, or opacity. Pigments, pigment dispersions, colorants, etc. are well known to the art and include, for example, graphite, titanium dioxide, carbon black, phthalocyanine blue, phthalocyanine red, chromium and ferric oxides, aluminum or other metal flake, and the like.

When an in-mold coating having a specific color is desired, one or more pigments, colorants, etc., can be utilized in suitable amounts. As known to the art, often times various pigments or colorants are added with a carrier, for example, a polyester, so that they can be easily blended. Any suitable mixing vessel can be utilized, and the various components and additives mixed until the compounds are blended. Even if pigments are not contained in the blend, the mixture at this point is not clear.

All of the above-described in-mold coating compositions that may be utilized in the present invention may contain other additives and fillers, etc., in amounts known to the art. For example, various cure inhibitors such as benzoquinone, hydroquinone, methoxyhydroquinone, p-t-butylcatechol, and the like, can also be utilized. Other additives may include an accelerator, such as cobalt octoate. Other classes of accelerators include zinc, or other metal carboxylates. Various light stabilizers can also be utilized such as, for example, the various hindered amines (HALS), substituted benzophenones, and substituted benztriazoles, and the like. Lubricants and mold release agents are generally utilized with specific examples including various metal stearates, such as zinc stearate or calcium stearate or phosphonic acid esters. Reinforcing fillers, such as talc, can be utilized. Other additives include hardeners, thixotropes, such as silica, and adhesion agents, such as polyvinyl acetate.

EXAMPLES

Example 1

Figure 9:
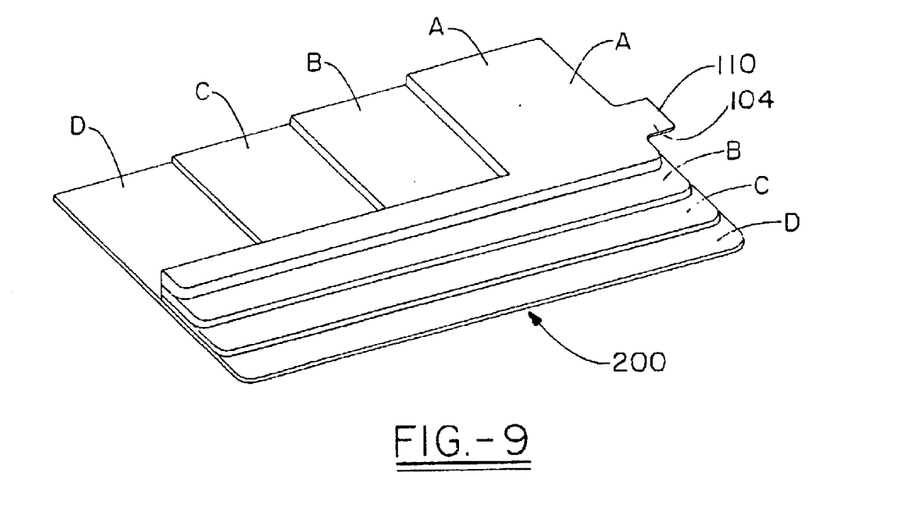
FIG. 9 is a front elevation view of a substantially flat molded plaque with a substantially flat show surface. The location of runner sections and thickness are shown for the benefit of the viewer.

A mold used to produce the plaque 200 shown in FIG. 9 was made. The mold cavity width is 12.0 inches. The mold cavity length is 20.5 inches. The mold has a hydraulic mold gate located in the center of the cavity for injection of a substrate. The mold has a tapered tab for the introduction of the IMC onto the part surface. The tab is located at the edge portion of the mold. The tab and Section A have thicknesses of 120 mils. Section B is 100 mils thick. Section C is 80 mils thick. Section D is 60 mils thick. As shown in FIG. 9, the plaque has four panels in a horizontal plane on the left side of the part and four panels in a vertical plane on the right side of the part. The panels on the horizontal plane on the right side of the part measure 6.0 inches long and 5.125 wide. The panels on the vertical plane measure 1.50 inches wide and 20.5 inches long. The plaque does not have an in-mold coating containment flange. The mold was placed in an 850 ton Cincinnati Milacron Vista injection molding machine. ABS resin heated to a temperature of 480° F. was injected into the mold cavity thus producing the part shown in FIG. 9 having sections with the above-described dimensions. FIG. 9 is a front view of the plaque. As stated above, the various sections A–D represent varying thicknesses of the plaque in the defined areas. The front of the plaque shown in FIG. 9 is a smooth surface and thus, the backside of the plaque shows the various thickness contour variations. After a hold time of approximately 120 seconds, an in-mold coating, Stylecoat® was injected through the tab portion of the plaque onto the front surface of the plaque. The chart below details how the in-mold coating flowed onto the different sections of the plaque.

| Amount of IMC | % of Full IMC Shot | Section A % Fill/mils* | Section B % Fill/mils* | Section C % Fill/mils* | Section D % Fill/mils* |
|---|---|---|---|---|---|
| .32 cubic inches | 25 | 75/1 | 15/.5 | 0/0 | 0/0 |
| .64 cubic inches | 50 | 98/3 | 85/1.6 | 10/.6 | 0/0 |

*1 mil = 0.001 inch

It was determined from the part surface area to be coated, and the desired coating thickness, that an in-mold coating amount of 1.2 cubic inches would produce a full in-mold coating shot and cover the entire plaque. As can be seen from the chart, upon in-mold coating injection onto the plaque surface, the top left panel and the inside vertical panel (runner section A) were preferentially coated when 25% of a full shot was utilized. Thus, this example shows that Section A is an effective runner section whereby the coating prefers to flow down the plaque along Section A and out to the side thereof before flowing into thinner sections B, C, and D. When 50% of a full in-mold coating shot was utilized, the in-mold coating began to flow from Section A and B into Section C. It is important to note that the plaque shown in FIG. 9 does not contain an in-mold coating containment flange. When coating levels above 50% of a full shot were utilized, the same leaked or seeped out of the mold cavity through the parting line. Thus, the need is clearly shown for an in-mold coating containment flange in order to keep the in-mold coating on the desired substrate surface. It has further been shown by the example that preferential coating of preferred or runner sections of a plaque can be obtained by utilizing the thickness of the wallstock to guide the in-mold coating across the part surface.

Example 2

Figure 10:
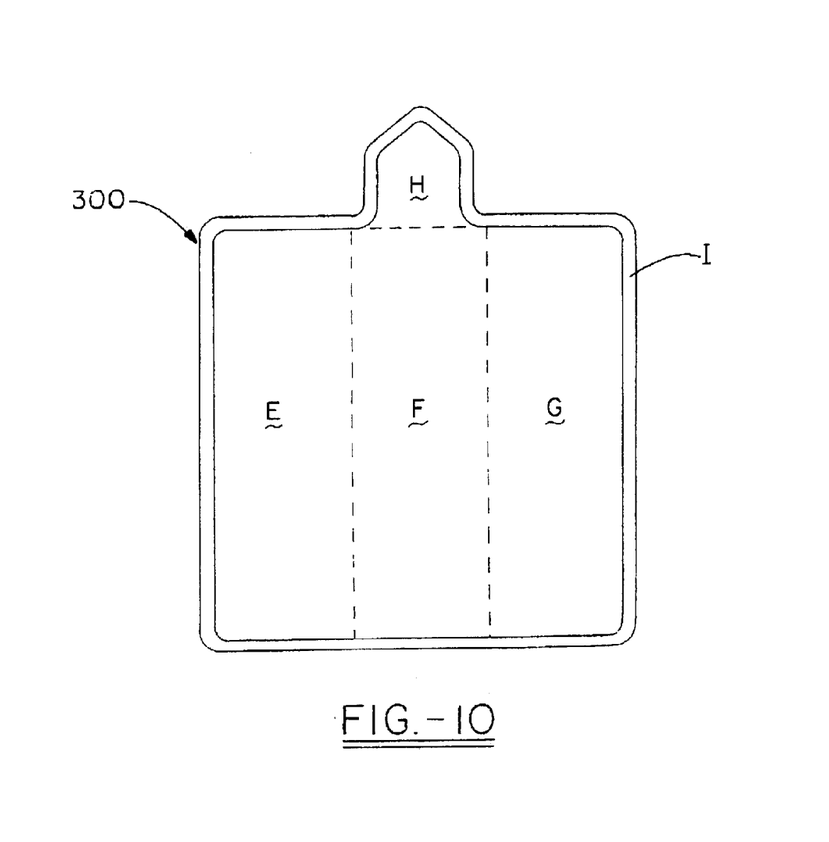
FIG. 10 is a front view of a molded substrate with areas of varying thickness illustrated.

FIG. 10 shows a thermoplastic article with a variety of substrate (thermoplastic) thicknesses. It was shown through experimentation that in-mold coating flow is influenced by the substrate thickness. The example parts were generated using a 50-ton injection molding machine, a 6-inch square steel mold cavity fitted with an IMC injection nozzle. The substrate material was a PET thermoplastic and the in-mold coating was OMNOVA's Stylecoat® IMC. The mold temperature was 250° F. with a 30 second delay time prior to IMC injection.

In FIG. 10, sections E, F, and G are representations of varying part thickness as shown by the chart below. Section H represents the in-mold coating tab design utilizing a thicker middle section which facilitates an in-mold coating flow channel at the in-mold coating nozzle tip site. Section I represents the thin sectioned containment flange.

The overall objective in designing a mold with thin and thick sections is to preferential channel the in-mold coating flow path in a desirable fashion. This can be manifested in several ways which include:

1. A channeling of the in-mold coating flow at the in-mold coating tab site (Section H) which preferentially deposits the in-mold coating inside the mold parting line onto the surface of the part.
2. A channeling of the in-mold coating flow in the part to more critical areas to fill since selective in-mold coating may be necessary in certain article designs (Sections E, F, and G).
3. A restriction of in-mold coating flow along the periphery of the mold to contain the in-mold coating on the surface of the part and within the parting line (Section I).

The observed in-mold coating coverage for the 6×6 mold is as follows:

| % of full IMC Shot | Section E % Fill/mils* | Section F % Fill/mils* | Section G % Fill/mils* | Section H % Fill/mils* | Section I % Fill/mils* |
|---|---|---|---|---|---|
| 50 | 100/3 | 80/2 | 20/1 | 100/2 | 0/0 |
| 80 | 100/4 | 100/3 | 40/2 | 100/3 | 0/0 |
| 100 | 100/4 | 100/3 | 100/3 | 100/4 | 0/0 |

Note:
Section E = 115 mils (thickness)
Section F = 85 mils
Section G = 60 mils
Section H = in-mold coating tab - 60 mils
Section I = containment flange - 25 mils
*1 mil = 0.001 inch In the example(s) we have shown that this preferential flow mechanism has advantages which include:
1. Preferential IMC flow and deposition to selected regions on a part as a result of varying thickness.
2. Achieving the containment of IMC on the part surface within the parting line resulting from a designed thin sectioned, IMC flow restricting, "containment flange."

In accordance with the patent statutes, the best mode and preferred embodiment have been set forth, the scope of the invention is not limited thereto, but rather by the scope of the attached claims.

What is claimed is:

1. An in-mold coated substrate, comprising:
the substrate; and
the in-mold coating, said substrate including a barrier, said barrier including a raised rim element extending around the perimeter of a substrate injection inlet area on the substrate to prevent said in-mold coating from ingressing to said substrate injection inlet area, and said in-mold coating at least coating a substrate area outside of said raised rim element.

2. A substrate according to claim 1, wherein said substrate injection inlet area is substantially free of said in-mold coating.

3. A substrate according to claim 2, wherein said rim element has a maximum height when compared to a height of said substrate injection inlet area of from about 1.05:1 to about 10:1, and a width of about 0.10:1 to about 5:1.

4. A substrate according to claim 3, wherein said rim element height when compared the height of said substrate injection inlet area is from about 1.75:1 to about 3:1, and said width is about 0.25:1 to about 1:1.

5. A substrate according to claim 4, wherein said rim element height when compared the height of said substrate injection inlet area is about 2:1, and said width is 0.35:1 to about 0.50:1.

6. A substrate according to claim 3, wherein said rim element includes at least one wall extending away from said substrate at an angle substantially perpendicular to the surface of said substrate adjacent said barrier.

7. A substrate according to claim 6, wherein said rim element includes two said walls and has a substantially constant thickness therebetween.

8. A substrate according to claim 6, wherein said rim element also includes a tapered or rounded portion.

9. A substrate according to claim 7, wherein said walls are of an equal height.

10. A substrate according to claim 3, wherein said barrier rim element is substantially cylindrical in shape, and wherein said substrate is thermoplastic.

11. A method for in-mold coating a substrate, comprising the steps of:
(a) injecting a thermoplastic substrate forming material into a mold cavity from an injection inlet point at a temperature above a melting point of said substrate forming material;
(b) forming a substrate in said mold cavity, said substrate comprising a barrier on a surface thereof, said barrier including a raised rim element extending around the perimeter of said injection inlet point and a substrate injection inlet area surrounded by said rim element;
(c) injecting an in-mold coating into said mold cavity on said surface of the substrate which includes said barrier; and
(d) allowing said in-mold coating to flow across the surface of said substrate, wherein the barrier prevents said coating from flowing onto said substrate injection inlet area.

12. A method according to claim 11, wherein said substrate injection inlet area is substantially free of said in-mold coating.

13. A method according to claim 12, wherein said rim element has a maximum height when compared to a height of said substrate injection inlet area of from about 1.05:1 to about 10:1, and a width of about 0.10:1 to about 5:1, and wherein said substrate injection inlet point includes a gate pin.

14. A method according to claim 13, wherein said rim element height when compared the height of said substrate injection inlet area is from about 1.75:1 to about 3:1, and said width is about 0.25:1 to about 1:1.

15. A method according to claim 14, wherein said rim element height when compared the height of said substrate injection inlet area is about 2:1, and said width is 0.35:1 to about 0.50:1.

16. A method according to claim 15, wherein said rim element includes at least one wall extending away from said substrate at an angle substantially perpendicular to the surface of said substrate adjacent said barrier.

17. A method according to claim 16, wherein said rim element includes two said walls and has a substantially constant thickness therebetween.

18. A method according to claim 17, wherein said rim element also includes a tapered or rounded portion.

19. A method according to claim 18, wherein said walls are of an equal height.

20. A method according to claim 19, wherein said barrier rim element is substantially cylindrical in shape.

21. The method of claim 11 wherein the mold cavity has a volume that remains substantially constant throughout steps a) to d).

22. The method of claim 11 wherein the mold cavity is defined by at least two mold members that remain a substantially fixed distance relative to one another during steps a) to d).

23. The method of claim 11, wherein the mold cavity is defined by at least two mold members that are not opened or unclamped in or between steps a) to d).

24. A mold half comprising:
a substrate injection inlet; and
a barrier forming relief formed in said mold half, said relief extending around said substrate injection inlet to prevent an in-mold coating from entering the substrate injection inlet, said relief having a width and a height.

25. A mold half according to claim 24, wherein said relief includes at least one wall extending into said mold half at an angle substantially perpendicular to a surface of the mold half adjacent said barrier forming relief.

26. A mold half according to claim 25, wherein said barrier forming relief includes two said walls and has a substantially constant width therebetween.

27. A mold half according to claim 26, wherein said walls are of substantially equal height.

28. A mold half according to claim 25, wherein said relief also includes a tapered or rounded portion.

29. A mold half according to claim 24, wherein said relief is substantially cylindrical in shape around said substrate injection inlet.

* * * * *